United States Patent [19]
Carpentier

[11] 3,840,713
[45] Oct. 8, 1974

[54] PORTABLE REEL FOR FLEXIBLE CONDUCTORS

[75] Inventor: John H. Carpentier, Fort Atkinson, Wis.

[73] Assignee: McGraw-Edison Company, Elgin, Ill.

[22] Filed: May 8, 1972

[21] Appl. No.: 250,966

[52] U.S. Cl......... 191/12.2 R, 242/85.1, 242/54 R, 242/96, 242/106, 242/129
[51] Int. Cl... H02g 11/02, B65h 75/36, B65h 75/40
[58] Field of Search......... 242/85, 85.1, 86.5 R, 96, 242/99, 106, 129, 82, 54 R, 86, 128; 191/12.2 R, 12.4, 12 R

[56] References Cited
UNITED STATES PATENTS

| | | | |
|---|---|---|---|
| 973,553 | 10/1910 | Peacock | 242/128 |
| 2,257,837 | 10/1941 | Burge et al. | 242/128 X |
| 2,480,401 | 8/1949 | Edwards | 191/12.4 |
| 2,506,354 | 5/1950 | Green | 242/86.5 R X |
| 3,006,020 | 10/1961 | Fillery | 242/85.1 X |
| 3,698,656 | 10/1972 | Ballenger | 242/106 |

Primary Examiner—John W. Huckert
Assistant Examiner—John M. Jillions

[57] ABSTRACT

The portable reel has a mounting plate to which a conductor holding spool is secured, where the spool defines an outwardly open annular recess within which the conductor can be wound. A guide element is supported for rotation about the spool in opposing relation to the spool recess. Anti friction means are carried on the guide element generally aligned radially of the spool recess, and said guide element defines an eyelet open forwardly away from the anti friction means. A conductor positioned through the eyelet and over the anti-friction means thereby is wound on or from the spool upon rotation of the guide element about the spool. Preferably, the guide element is of a two-piece construction split along the eyelet to allow the conductor to be positioned therein without removing either connector even though the same might be larger than the eyelet. The plate is adapted to be separably connected to a bracket secured to a wall or other like permanent structure during preferred use of the reel.

1 Claim, 3 Drawing Figures

PATENTED OCT 8 1974  3,840,713
FIG.1
FIG.2
FIG.3
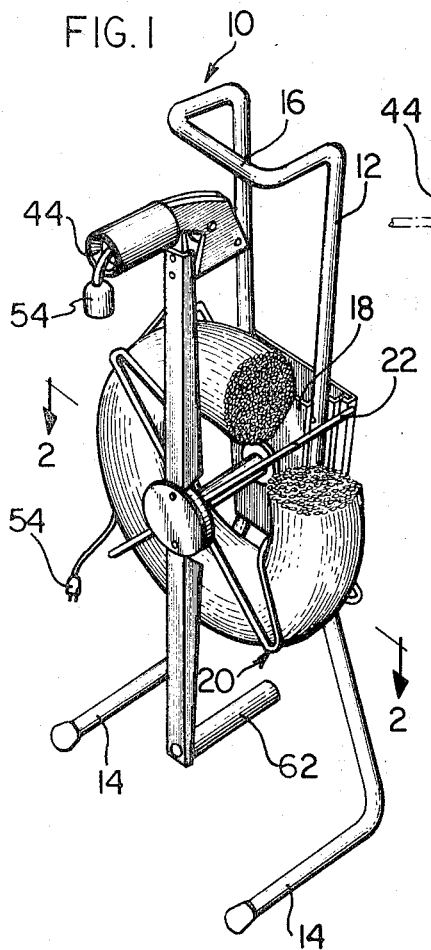
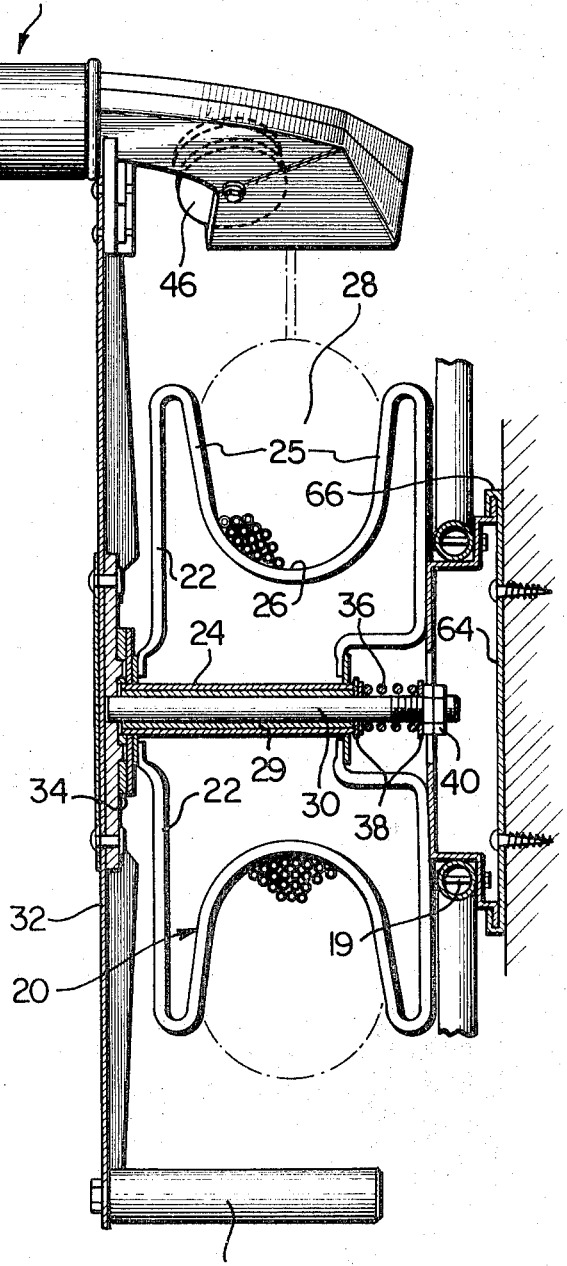
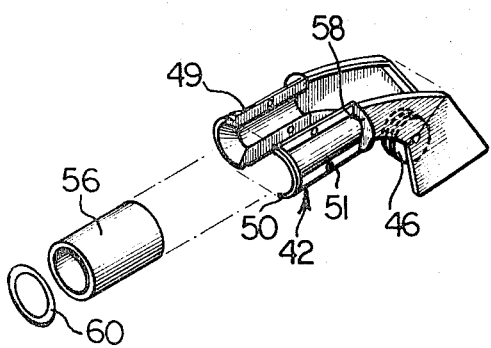

PORTABLE REEL FOR FLEXIBLE CONDUCTORS

This invention relates to, and a basic object of this invention is to provide, a portable reel on and from which any flexible elongated conductor can be wound and unwound, even such conductors having enlarged male and female end connectors, with no splicing of the conductor or of the connectors. The proposed reel is economical to fabricate, light in weight and portable, and can compactly hold the conductor and allow it to be unwound or wound as needed even while the conductor is in use.

The invention will be more fully understood and appreciated after reviewing the following specification including the accompanying drawing, wherein:

FIG. 1 is a perspective view of the reel shown with a cord completely wound thereon:

FIG. 2 is a sectional view as seen generally from line 2—2 in FIG. 1, except with the cord guide being rotated 90° from the position shown in FIG. 1, and further showing the reel mounted for use on a wall bracket; and FIG. 3 is an exploded perspective view of the cord guide used in the reel.

The reel 10 shown has a tubular frame element 12 shaped to have lower forwardly bent feet 14 and an upper loop handle 16. A mounting plate 18 is secured to the tubular element 12 as by rivets 19 and a stationary spool 20 is secured as by welding to the forward side of the plate 18. The spool is of four like wire or rod elements 22 oriented at 90° intervals and secured to a hub 24, and thus with the defined opposing radial faces 25 and interconnecting faces 26 an outwardly open annular recess 28 is defined forwardly of and parallel to the plate 18.

The hub 24 receives a bearing sleeve 29 which in turn receives and supports rotatably a shaft 30 secured at its forward end to arm 32. A friction disc 34 is interposed between the stationary spool frame and arm 32, and coil compression spring 36 is positioned over the shaft 30 to operate between a pair of thrust washers 38 bearing against the spool frame and nut 40 threaded onto the shaft. In this manner the arm is oriented adjacent and crosswise to the forward end of the spool 20 and can be rotated relative to the spool against an adjustable drag as required and as determined by the setting of the nut on the shaft.

An annular guide element 42 is secured at one arm end and defines eyelet opening 44 facing forwardly away from the plate and an opposite opening aligned generally radially of and facing the spool. An antifriction pulley element 46 is provided at the juncture of the opposite end openings. In the preferred embodiment, the guide element is of a split two-piece construction which separates completely along the bore (such as shown in FIG. 3 with components 49 and 50 being separably held together by conventional bolt means 51) to allow the easy positioning of an elongated conductor in place and around the anti friction pulley even though the end connector 54 might be larger than the eyelet. Also, the anti friction pulley element 46 is preferably mounted to rotate about an axis extended normal to the axis of rotation of the arm and/or guide element about the spool, and further normal to a line through the pulley element drawn tangent from the conductor buildup on the spool. In this way, the conductor can pass through the eyelet and around the anti-friction pulley with a minimum of drag and kinking.

A tubular plastic handle 56 is fitted over and rotates on the assembled guide element 42. This allows comfortable manual rotation of the guide element about the spool for winding the elongated conductor onto the spool. The handle is held in place against guide element shoulder 58 by an O-ring 60 received in a groove at the opposed end of the guide element. Counterweight 62 is secured to the arm end opposite the guide element and projects toward the mounting plate with radial clearance from the spool.

Bracket 64 is provided for supporting the reel 10, the bracket being secured to a building wall or like permanent structure proximate the power outlet or like, and has downwardly converging opposing side channels 66 that receive correspondingly downwardly converging side edges of the mounting plate 18. This releasably supports the portable reel in a fixed manner so that it can be easily operated, while yet allows complete removal of the reel and conductor thereon as for storage. By having several brackets each located proximate a convenient outlet, it is possible to use the reel at any of these locations.

To initially put an electric conductor on the reel, the guide element is disassembled, the handle slipped over one connector, and an intermediate part of the conductor is placed in one component bore with the male connector or plug being located adjacent the spool and the female connector located forwardly of the eyelet. Enough conductor lead is kept at the reel for connection to an appropriate outlet connection, and the remaining conductor is then wound on the spool by rotating the arm around the spool uniformly in the direction where the conductor comes off the spool straight toward the pulley and normal to the rotational axis thereof. The conductor can be unwound from the reel by pulling in a direction generally forwardly of the reel. Either winding or unwinding of the conductor can be done with the conductor in use, viz plugged in and conducting electric current.

What is claimed is:

1. A portable reel for an elongated flexible conductor having enlarged connectors at its opposite ends, comprising the combination of a mounting plate and means for supporting the mounting plate, a spool secured at a rear end to the plate and defining an outwardly open annular recess within which the conductor can be wound, bearing means supported centrally of the spool, a shaft rotatably mounted in the bearing means, an arm secured to the shaft at one end for rotation about a forward end of the spool opposite the mounting plate, opposed faces defined respectively, on the spool and arm radially of the shaft and an annular friction disc surrounding the shaft between said faces, means on the shaft and spool respectively, including a compression spring for compressing the disc and said means being adjusted to set the ease with which the arm can be rotated, guide means carried at the end of the arm, a pulley supported in the guide means at a location radially of the spool recess and mounted to rotate about an axis that is generally normal to both the bearing means and a tangent line taken generally from the conductor as wound on the spool, said guide means being formed of two pieces butted and means releasably holding the pieces together and defining therebetween an eyelet open forwardly in the direction away from the pulley, whereby the separation of said two-pieces allows the placement of the conductor through the eyelet and around the pulley without dismantling either connector in any way even though the connector might be larger than the eyelet, a single piece tubular handle removably positioned over the guide means annularly of the eyelet and being rotatably thereon, said handle having an internal bore larger than at least one of the connectors to allow said one connector to be fitted through the handle, and means securing the handle in place on the guide means.

* * * * *